US011455984B1

(12) United States Patent
Haslam et al.

(10) Patent No.: US 11,455,984 B1
(45) Date of Patent: Sep. 27, 2022

(54) NOISE REDUCTION IN SHARED WORKSPACES

(71) Applicant: UIPCO, LLC, San Antonio, TX (US)

(72) Inventors: Justin Dax Haslam, San Antonio, TX (US); Donnette L. Moncrief Brown, San Antonio, TX (US); Eric David Schroeder, San Antonio, TX (US); Ravi Durairaj, San Antonio, TX (US); Deborah Janette Schulz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/083,034

(22) Filed: Oct. 28, 2020

Related U.S. Application Data

(60) Provisional application No. 62/927,545, filed on Oct. 29, 2019.

(51) Int. Cl.
*G10L 15/20* (2006.01)
*G10L 13/10* (2013.01)

(52) U.S. Cl.
CPC ............ *G10L 15/20* (2013.01); *G10L 13/10* (2013.01)

(58) Field of Classification Search
CPC ..... G06F 16/483; G10L 15/26; G10L 13/033; G10L 15/20; G10L 13/10; G10L 21/02
See application file for complete search history.

(56) References Cited

U.S. PATENT DOCUMENTS

| 5,895,447 A * | 4/1999 | Ittycheriah | G10L 15/07 |
| | | | 704/251 |
| 10,339,925 B1 * | 7/2019 | Rastrow | H04L 67/306 |
| 2004/0210437 A1 * | 10/2004 | Baker | G10L 15/32 |
| | | | 704/251 |
| 2008/0249772 A1 * | 10/2008 | Martynovich | G10L 21/0364 |
| | | | 704/233 |
| 2017/0025121 A1 * | 1/2017 | Tang | G10L 17/06 |
| 2017/0243582 A1 * | 8/2017 | Menezes | G10L 13/033 |
| 2018/0233127 A1 * | 8/2018 | Visser | G10L 15/26 |
| 2019/0370283 A1 * | 12/2019 | Church | G06F 16/483 |
| 2020/0403818 A1 * | 12/2020 | Daredia | G10L 15/26 |

* cited by examiner

*Primary Examiner* — Huyen X Vo
(74) *Attorney, Agent, or Firm* — Plumsea Law Group, LLC

(57) ABSTRACT

A method and system of reducing noise associated with telephony-based activities occurring in shared workspaces is provided. An end-user may lower their own voice to a whisper or other less audible or intelligible utterances and submit such low-quality audio signals to an automated speech recognition system via a microphone. The words identified by the automated speech recognition system are provided to a speech synthesizer, and a synthesized audio signal is created artificially that carries the content of the original human-produced utterances. The synthesized audio signal is significantly more audible and intelligible than the original audio signal. The method allows customer support agents to speak at barely audible levels yet be heard clearly by their customers.

20 Claims, 9 Drawing Sheets

NOISE REDUCTION IN SHARED WORKSPACES

CROSS-REFERENCE TO RELATED APPLICATION

This application claims the benefit of U.S. Provisional Patent Application Ser. No. 62/927,545 filed on Oct. 29, 2019 and titled "Noise Reduction in Shared Workspaces", the disclosure of which is incorporated by reference in its entirety.

TECHNICAL FIELD

The present disclosure generally relates to noise reduction in open office environments, and more specifically to offering a mechanism by which a caller can lower their own speech volume while continuing to provide a high-quality conversation experience to a customer.

BACKGROUND

Customer support and information centers, or call centers, are commonly set up by government agencies, organizations, and business operations to handle customer inquiries and to provide support for their products and services. For example, a customer support center may be a location with a few persons who handle incoming and outgoing customer calls. For larger organizations, the support center may be a dedicated facility with a large group of support personnel with advanced computers and telecommunication equipment, where the employees make calls and receive incoming customer inquiries. In some cases, a support center may handle customer calls concerning the repair or maintenance of their goods or services, or to otherwise interact with their customers. There are a wide range of applications that facilitate the activities of the support centers, such as sales applications, including order entry and reservation applications, financial services applications, including funds transfer and stock transactions, and customer service applications, including technical support, repair and claims handling. It may be appreciated that the various noise within an open space can be problematic for people who must work in such areas. For example, many businesses are located in office buildings that utilize a large open plan workspace area in which employees work in cubicles with low cubicle walls or at workstations without any acoustical barriers.

In these types of settings, the experience of making and receiving phone calls or conducting speech-based dialogue may be diminished for both the persons in the office and any remote callers. The ongoing background noise can be both random and dynamic, and frequently interferes with the quality of conversations and work production. More than other sounds, the human brain is far more receptive to speech-based sounds and so voices remain highly distracting. In addition, other types of random dynamic noise such as keyboard noises, phones ringing, doorbells or other noises that come and go can be transmitted over the telephony system and reduce the intelligibility of the speech to a remote listener.

Some office acoustic designs attempt to reduce these and other types of ambient noise. However, such designs can sometime such quiet sound environments can make speech noise even more distracting, in a manner similar to how someone speaking in a library can be particularly obtrusive. In addition, even with the more successful noise-reduction designs, only the radius of distraction from dynamic noise is reduced, and so conversations from neighboring cubicles or an adjacent desk continue to prove intrusive and distracting. These problems are becoming increasingly significant as companies position more office workers in a single space.

There is a need in the art for a system and method that addresses the shortcomings discussed above.

SUMMARY

In one aspect, a method for reducing noise in a shared work environment is disclosed. The method includes receiving a first audio signal representing a first utterance of a human end-user, and performing automated speech recognition on the first audio signal to produce a first data file identifying one or more words conveyed by the first utterance. The method further includes converting the first data file to a second audio signal via implementation of a speech synthesizer. The second audio signal is more audible than the first audio signal, and the second audio signal is synthesized speech representing a sequence of one or more words included in the first utterance. The method also includes transmitting the second audio signal to a second device.

In another aspect, a system for reducing noise in a shared work environment includes a processor and machine-readable media including instructions which, when executed by the processor, cause the processor to receive a first audio signal representing a first utterance of a human end-user, and perform automated speech recognition on the first audio signal to produce a first data file identifying one or more words conveyed by the first utterance. The instructions further cause the processor to convert the first data file to a second audio signal via implementation of a speech synthesizer, where the second audio signal is more audible than the first audio signal, and the second audio signal is synthesized speech representing the one or more words of the first utterance. In addition, the instructions cause the processor to transmit the second audio signal to a second device.

In another aspect, a system for reducing noise in a shared work environment includes means for receiving a first audio signal representing a first utterance of a human end-user, and means for performing automated speech recognition on the first audio signal to produce a first data file identifying one or more words conveyed by the first utterance. The system further includes means for converting the first data file to a second audio signal via implementation of a speech synthesizer, where the second audio signal is more audible than the first audio signal, and the second audio signal is synthesized speech representing a sequence of one or more words included in the first utterance. The system also includes means for transmitting the second audio signal to a second device Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inven

DESCRIPTION OF EMBODIMENTS

Figure 1:
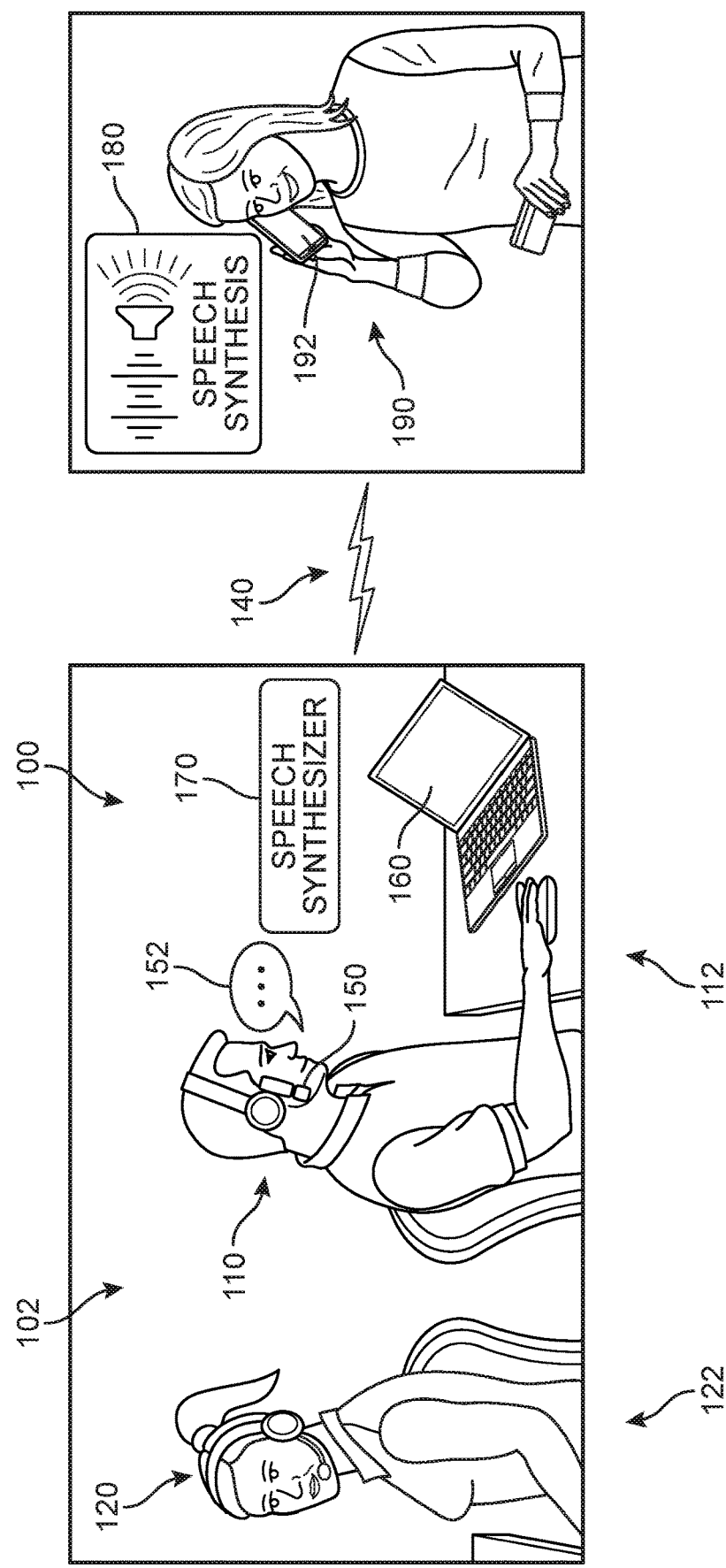
- FIG. 1 is an overview of a process of reducing noise in a shared workspace, according to an embodiment.

As noted above, office noise, and in particular speech noise, frequently interferes with and lowers the productivity in everyday work environments. When coworkers or other room residents attempt to compensate for the nearness of their neighbors by speaking in a lowered voice or whisper, the remote listener becomes frustrated by the diminished intelligibility of the speech, which in turn can decrease customer satisfaction. The disclosed embodiments provide a system and method for participating in a telephony-based conversation while maintaining a minimally intrusive sound presence. Specifically, embodiments of the proposed system and method aim to reduce the distractions associated with spoken utterances in a shared workspace. This occurs by the 'translation' of a natural speech signal that may be barely intelligible or audible, such as a whisper, or 'silent speech', into a new synthesized sound signal that represents the same word content while improving speech intelligibility for the listener.

In many cases a service representative is at a location that is remote relative to a customer's location, such as an office or call center. As will be discussed in greater detail below, the proposed systems and methods facilitate interactions with a customer by generation and playback of highly audible and intelligible synthesized speech corresponding to a live agent's real (low-quality) speech. As used herein, the term "customer" should be understood tor refer to any end-user or person requesting or receiving assistance or other communications from a remote agent. Furthermore, the support agent is the one who is located in a shared workspace and is the primary utilizer of the disclosed systems. The support agent can wear a headset with a high-sensitivity microphone or bone-conduction microphone (BCM) that are configured to connect to a telephony network and/or telephony-based software application. As part of this arrangement, the microphone device can receive an audio signal that is weak or otherwise of low-quality from the customer support representative and, in real-time, determine the words that were spoken and convert the information to a strong, high-quality audio signal for the benefit of the customer.

For purposes of this application, to the term microphone refer to instruments that convert sound waves into electrical signals. While traditional air conduction (AC) microphones used in communication applications is that is that they are not very effective in noisy environments, because as a general matter, any airborne sounds that can be picked up by the human ear can also be picked up by traditional air microphones. Thus, communication loses some degree of intelligibility in high noise levels when using such microphones. This issue becomes more problematic when a user attempts to lower their own voice to accommodate others' comfort in a shared workspace.

Thus, in the proposed embodiments, microphones specifically configured for use in close proximity to a speaker will be used. For purposes of this application, such proximity-sensitive microphones (PSMs) can be designed for high sensitivity of sounds that are very close or near to the microphone. As some non-limiting examples, PSMs can include high-sensitivity microphones, noise canceling microphones, throat microphones, as well as bone conduction microphones (BCMs). High-sensitivity microphones are designed to pick up quieter sounds, typically due to a lighter and more "sensitive" diaphragm which can react to smaller variations in air pressure. A noise-cancelling microphone is designed to filter out ambient noise, thereby blocking or cancelling external noise and allowing the speaker's voice to pass through clearly. A throat microphone can also be used when the talker is in motion. The throat microphone is attached to the neck directly on top of the skin covering the vocal cords and is not as susceptible to ambient noise as an air microphone. In many cases, the BCM, which is typically mounted on a user's head, is an ideal candidate, as it eliminates most of the problems such as physical discomfort caused by other microphones and additionally may be hidden under the user's hair or headgear making it virtually invisible to passersby. Furthermore, BCMs are less susceptible to background noise and are less likely to be shifted out of their optimal position due to a person's movements. In addition, a BCM can be used to produce high intelligibility and high quality BCM speech signals with more readily discernable word patterns. In many cases, the PSM utilized in the proposed systems can incorporate features combining some or all of these types of microphones. It can be appreciated that other devices may also be used with the disclosed systems that provide similar functionality. For example, wearable devices such as AlterEgo™ can detect tiny shifts in the muscles that help generate speech that occur when an individual subvocalizes. In other words, in some embodiments, the agent or other end-user can subvocalize a word, the wearable can detect it by tracking the electrical signals in the facial muscles and vocal chords, and translate this subvocalization (also referred to as 'silent speech') into a meaningful command for a computer.

Furthermore, some embodiments of the proposed systems and methods may make use of various techniques and technologies, such as but not limited to speech processing, speech synthesis, and Natural Language Processing (NLP) systems. As a general matter, speech processing is a technology that allows computing devices to recognize—and, to some extent, understand—spoken language. Typically, one or both of two types of software products may be implemented: continuous-speech recognition software products and command-and-control software products. In addition, speech synthesis is a process that provides the ability to mimic speech. Because it is increasingly important that the synthesized output sounds are pleasant and sound human enough to encourage regular use, the associated software products offer highly effective and accurate conversational generation and mimicry. Similarly, NLP systems are systems that are configured to interpret written, rather than spoken, language and may be found in speech processing systems that begin by converting spoken input into text. Using lexicons and grammar rules, NLP parses sentences, determines underlying meanings, and retrieves or constructs responses.

It should be understood that while the following description presents a sequence of examples illustrating the use of the proposed systems and methods in a customer-agent dynamic, in other embodiments, the proposed systems may be utilized by a broad range of end-users, including other types of work calls and personal calls. For example, there are many occasions in which a person in a crowded room—or even a space with only one other person—may desire privacy when they are speaking, while continuing to maintain their conversation with the person on the other end of the call. By making use of this type of system, anyone can make discreet calls while in the presence of others without the risk of being overheard, even while maintaining a clear and intelligible dialogue with the remote listener.

Referring now to FIG. 1, for purposes of introduction, a first agent 110 employing a first speech synthesis-based noise reduction system ("first system") 100 is shown seated at a first work station 112 that is directly adjacent to a second agent 120 seated at a second work station 122 in a call center 102. The two work stations are positioned only a few feet apart. The second agent 120 is engaged in her own project and/or conversations, and does not wish to be distracted or disturbed by ambient noise or speech. The first agent 110, in order to ensure he causes only minimal disturbance to his neighbor coworker, has donned a first PSM-equipped headset ("first headset") 150 and connected the first headset 150 to other components of the first system 100. In this case, first system 100 includes the first headset 150, a first computing device ("first device") 160, and a speech recognition and synthesizer platform ("platform") 170 that is accessible via first device 160. In some embodiments, the platform 170 is available as a local resource stored on the first device 160, while in other embodiments, some or all features of the platform 170 are made available via a remote cloud service. In addition, the platform 170 is configured to communicate and convey information over a telephony application and/or network 140. The first device 160 can include an electronics unit comprising a plurality of different components, such as a user interface component (e.g., a touchscreen display, keyboard, mouse, speakers, etc.), a user interface module, a processor, and/or a communication module. For purposes of this example, first device 160 can be a desktop computer, laptop, tablet, or other computing device configured for connection to a network.

Furthermore, the first device 160 includes one or more processors and memory. Memory may comprise a non-transitory computer readable medium. Instructions stored within memory may be executed by the one or more processors. The first device 160 may be configured to receive and analyze audio signals from one or more microphones connected to the first device 160 or data that is communicated from other devices to the first device 160. A communication module may allow the first device 160 to communicate wirelessly. In different embodiments, the first device 160 may communicate with a mobile computing device, wireless devices, and/or with networked computers, for example over the internet. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1, the first agent 110 is engaged in a communication session with a first customer 190. The first customer 190 can participate in the communication session via a telephone or a computing device configured with a network connection, depending on the mechanism utilized for data transmission. In this case the first customer 190 is speaking and listening to the call via a mobile phone (computing) device 192. However, in other embodiments, no computing device is necessary to implement the disclosed systems, and a traditional telephone service may be used by the customer or other listener.

In order to minimize the distraction that would otherwise be caused or associated with his ongoing communication session, first agent 110 emits an audio output that is barely audible and targeted to his PSM 150. In other words, speech signal 152 produced by the first agent 110 are spoken in soft tones or with a substantially lowered volume than would be normally occur in a spoken conversation. In some cases, the first agent 110 may be whispering, and in another example, he may be murmuring an utterance. The words comprising the utterance may be imperceptible or barely perceptible to other persons in the environment around the first agent 110. Thus, as the first agent 110 speaks, second agent 120 may not be able to hear the speech, remaining comfortably focused despite the near proximity of others who are speaking.

The speech signal 152 are detected by the PSM 150 and transmitted to the first device 160 for processing by the system 100. System 100 can apply artificial intelligence and/or machine learning algorithms to determine the content of the speech signal 152 and identify or 'translate' the specific words from this barely audible sound. These words as well as information about tone in the speech signal 152 and other speech patterns typical for the first agent 110 which may have been previously collected by the system may be provided to a speech synthesizer 170. The speech synthesizer 170 receives this data and converts it back to artificially generated speech 180 that is clear, loud, and free of ambient noise. This is passed onward to the customer 190 via a telephony network or application such as a teleconferencing client. Thus, the workspace continues to operate efficiently, as both agents are able to fulfill their responsibilities with little disruption caused to one another, promoting a more relaxed and productive work environment.

Figure 2:
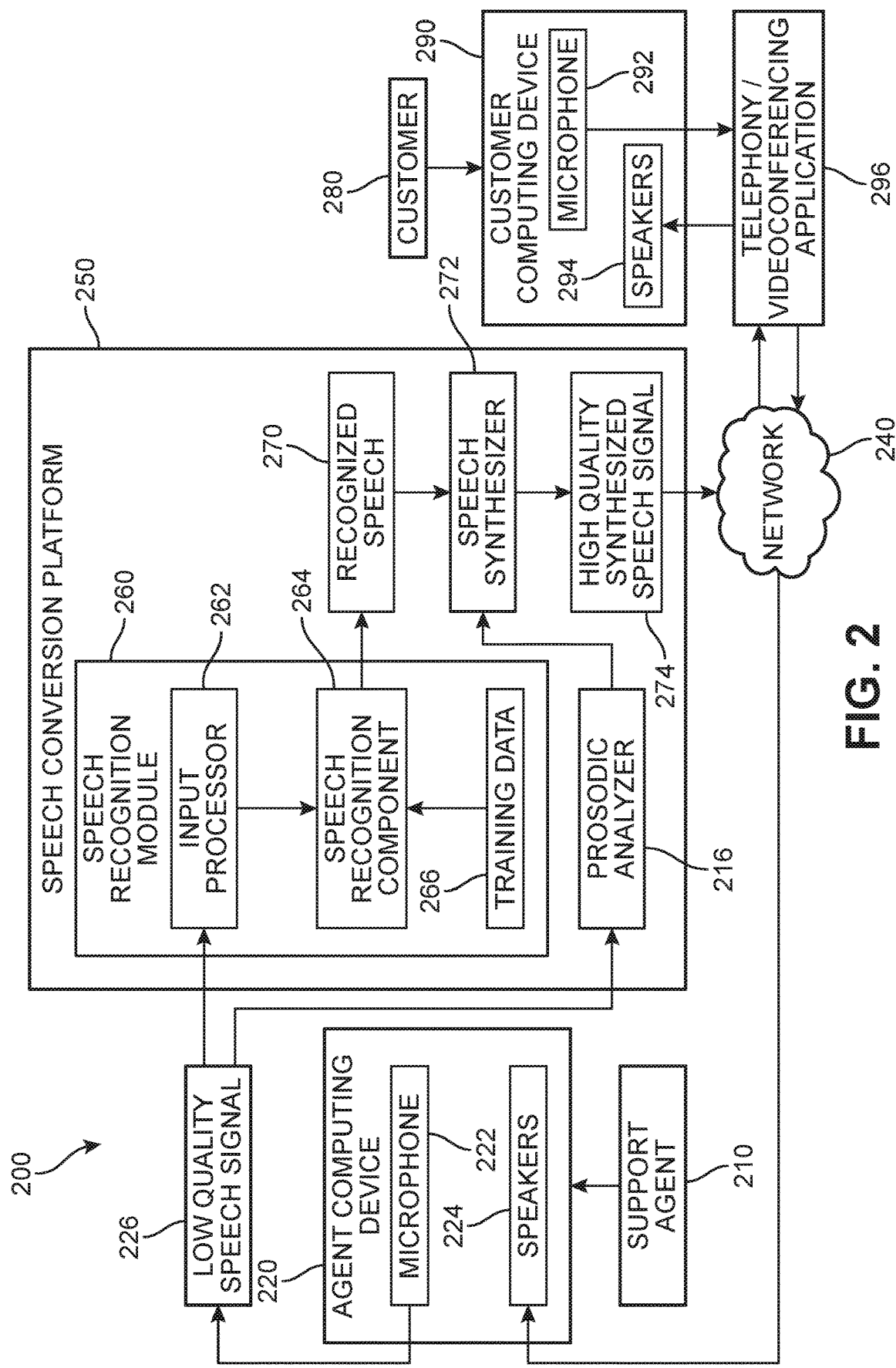
FIG. 2 is a schematic diagram of a system for reducing noise and converting low-quality speech to high-quality speech via speech synthesis, according to an embodiment.

Referring now to FIG. 2, a schematic diagram representing the architecture of one embodiment of a noise reduction system ("system") 200 is illustrated. As shown in FIG. 2, the system 200 includes an agent computing device ("agent device") 220, a customer computing device ("customer device") 290, and a speech conversion platform ("platform") 250 that works in conjunction with a telephony/videoconferencing application ("application") 298 such as a telephone connection or teleconferencing software application.

For example, implementations described herein may be performed via any electronic communications between an agent and a customer including, but not limited to, telephone, video telephone, chat (e.g., IM, Slack™, Jabber™), video chat (e.g., Skype™, MS Teams™, Facetime™) internet based meetings (e.g., WebEx™), custom call-center systems, and other conference call systems.

The agent device 220 and customer device 290 are configured to communicate with one another, for example via a Wi-Fi, cellular, or other network connection 240 and make use of and receive and share data with platform 250. In some examples, agent and/or customer devices can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers.

While the application 296 and the various components of platform 250 are shown as residing outside of agent device 220 in FIG. 2, accessed by agent device 220 and customer device 290 through a cloud network and stored on a cloud-based server, in other embodiments some or all modules and components described herein can reside locally on the agent device 220 and/or customer device 290. In some embodiments, some or all components of platform 250 may be stored at and executed by multiple computing systems, while in another embodiment, these components may be accessed via one or more web-based applications accessed and executed via the call center network and/or network connection 240.

In different embodiments, the agent device 220 includes or is connected to a microphone 222 and speakers 224. Furthermore, although not shown in FIG. 2, in some embodiments, a support agent ("agent") 210 can receive and send information through a user interface that may be presented on a device display. The user interface may refer to an operating system user interface or the interface of one or more software applications that may run on the agent device 220. In some embodiments, the user interface can include a messaging window or other chat-space by which the support agent may send text messages or other digital content to a customer. In other examples, the platform 250 may provide or be in communication with a user interface shown to the agent 210 that allows agent 210 to access and adjust settings and preferences of features associated with the speech conversion process, such as volume and other sound controls, voice training data collection, user profile creation and updates, network settings, voice synthesis options (including selection of other voice personas, such as gender and accent), viewing of the speech text that is being detected in the agent's utterances in real-time or at a later time, and other options that allow the agent to personalize the conversation experience.

As a general matter, a call management or customer support server can manage the distribution, transfer, and handling of various calls that come into the support center or office. For example, a customer may be routed via the customer support server to an appropriate agent computing device associated with a particular member service representative (MSR) better suited to respond to the particular caller. The support agent 210 can refer to any person or personnel who offers the caller (or person who was called) assistance, and appears to interact with the member or other individual by generation of a synthesized speech that mimics their own (low-quality/volume) speech in real or approximately real-time.

In FIG. 2, it can be seen that during a communication session between an agent 210 and a customer 280, the agent 210 provides various inputs to the agent device 220, for example via speech received by microphone 222, and receives output such as customer utterances via speakers 224. It should be understood that in this case the term microphone refers to one or more of the various types of PSMs described in greater detail above. The agent's ongoing live voice input—in the form of whispered or murmured words and/or subvocalized speech, herein referred to as a low-quality speech signal 226—is received by a speech recognition module 260 of platform 250 through an input processor 262. Voice recordings can include recordings in various data formats including, but not limited to, MP3, WAV, AIFF, FLAC, OGG, and ACC files. Generally, audio is recorded using an audio codec. The processed signal is conveyed to a speech recognition component 262 which is configured to use acoustic models and language models to statistically analyze the sound recording and identify likely words.

For example, the speech recognition component may take the digital or analog audio signal from the call and performs speech recognition analysis to recognize one or more words spoken. Speech recognition (also referred to as automatic speech recognition (ASR), computer speech recognition or voice recognition) technology generally represents a set of technologies that allows computers equipped with a source of sound input, such as a microphone, to transform human speech into a sequence of words recorded in a computer data file. Some examples of these include the use of Hidden Markov Models (HMMs), dynamic algorithms, neural network-based models, and knowledge-based approaches. Certain systems can recognize natural human speech which has the property of words "sticking together" (or coarticulated together), also referred to as continuous speech (continuous speech recognition). Other speech recognition systems and technologies may be applicable as well. In some embodiments, the speech recognition component can make use of statistical language models (SLMs) and statistical semantic models (SSMs) that determine what a speaker means in addition to the words they said. In some embodiments, the speech recognition component 262 generates a transcription of the voice recording that can be accessed and viewed by the agent 210. Furthermore, as will be discussed below with respect to FIG. 3, in some embodiments, the agent can participate or otherwise provide training data 266 that can bolster the accuracy of the model used by speech recognition component 262. For example, the training data 266 can reflect previously recognized speech patterns and corresponding sounds for an individual agent.

In the embodiment of FIG. 2, the identified words are transmitted as a recognized speech file 270 to a speech synthesizer 272. In some optional embodiments, a prosodic analyzer 268 may also be applied to the low-quality speech signal 226. For purposes of this application, prosody describes the rhythmic and international aspects of a spoken language. When a speaker utters a phrase or sentence, the speaker often places accents on certain words or phrases, to emphasize what is meant by the utterance. Because text-to-speech synthesizer systems do not generally simulate the natural flow and inflection of the human-spoken phrase or sentence accurately, in some embodiments, the proposed speech synthesizer 272 can incorporate prosodic analysis into the process of rendering synthesized speech. It is to be understood that various known prosodic techniques are within the scope of the present embodiments.

Following the receipt of the recognized speech 270 (and optionally the output of the prosodic analyzer 268) the speech synthesizer 272 can generate a high-quality synthesized speech signal 274 that accurately represents the word content of the low-quality speech signal 226. In other words, the speech synthesizer 272 renders audible speech using the text determined by the speech recognition module 260 and applying the prosodic representation of the original audio signal data. This new, clear, artificially produced audio signal is sent via network 240 and/or application 296 to the customer device 290 for playback via speakers 294. The customer 280 can thereby hear a fully audible and highly intelligible utterance and participate in the conversation via microphone 292 of the customer device 290. In some embodiments, the synthesized speech is in the agent's own voice, by modulation of the computer-generated speech to mimic the agent's voice. Thus, transitions between the synthesized speech and actual, real-time speech by the customer appear, to a caller, as a seamless conversation; when in reality the agent is only murmuring his or her own portions of the conversation and a computing system is rendering such audio signals into an artificial clear audio signal for insertion into a media stream of a call.

Figure 3:
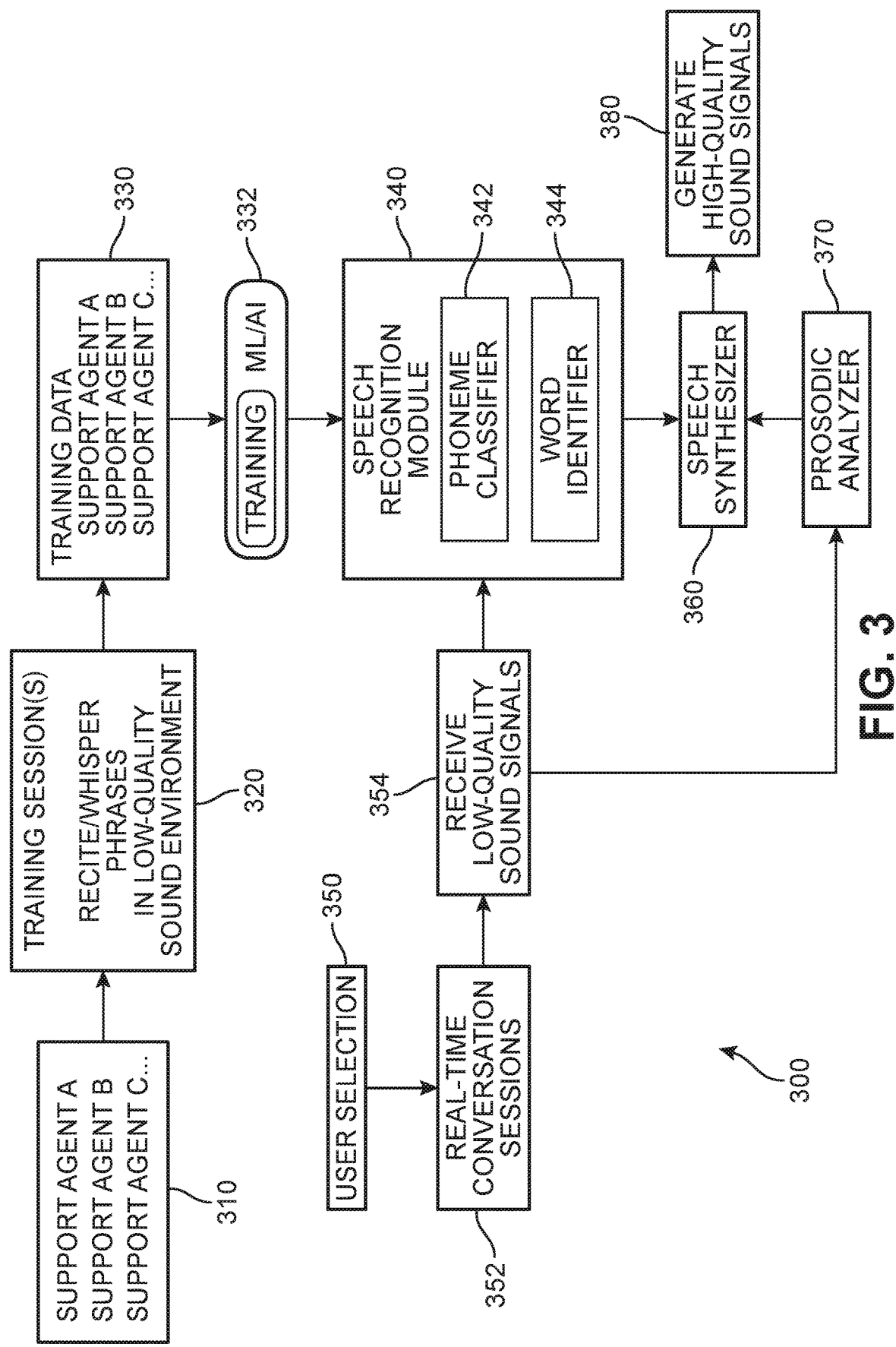
FIG. 3 is a flow diagram of a process of training a speech recognition model to generate synthesized speech, according to an embodiment.

Referring now to FIG. 3, an example process of synthesizing personalized speech patterns is shown. At a first stage 310, one or more end-users (for example, a plurality of support agents of a call center) represented here as Support Agent A, Support Agent B, and Support Agent C, enroll or request initial access to the platform. The agents can be requested to participate in a series of training sessions in a second stage 320, where the individual agents recite a variety of utterances displayed to the agent in the prosodic affect, tone, and volume of voice that will be used during actual calls made through the platform 250 of FIG. 2, and then repeat the same utterances in a louder speaking voice corresponding to the type of voice that would normally be used to speak to a customer. In other words, prior to the conversation sessions, an end-user may provide, record, and/or generate sets of training speech signals to the platform. For example, the end-user may be a new employee and may be asked to read a script of text as part of an employee orientation, speaking into a microphone (e.g., the selected PSM) and/or to recite with particular emotional tones or expressive states, both at a lowered intelligibility and at a higher intelligibility.

The recorded voice data will be stored as training data 330 and shared with a machine learning and/or artificial intelligence algorithm to train the synthesizer in a third stage 332. This data is used to ensure that speech recognition module 340 is properly configured to accurately identify the words spoken by the same end-user in later 'real' conversation sessions. In some embodiments, each end-user can be asked to log-in to the platform or otherwise identify themselves (user selection 350) to allow the system to apply the correct training data during the upcoming real-time conversation session 352. Although not shown here, in some embodiments, the speech recognition module 220 can apply voice recognition techniques to identify the speaker and access the correct training data. Thus, when the end-user produces low-quality sound signals in a fourth stage 354 received by the speech recognition module 340, both a phoneme classifier and word identifier 344 can be personalized to correctly recognize the words for each individual.

A speech synthesizer 360 can then generate the synthesized speech in a fifth stage 380. In some embodiments, a prosodic analyzer 370 can also be implemented to generate a tone that matches the content and expression of the original sound signals. In some cases, the speech synthesizer 360 can specifically use portions of the previously recorded utterances from the training data. For example, a training session may have recorded the words "How are you?" in an agent's normal speaking voice along with the same phrase as murmured or whispered. When the speech recognition module determines that the same phrase is being murmured during a live conversation session, the speech synthesizer may use the particular portion of training audio to generate the new signal. In some embodiments, a particular portion of the training data may be detected and copied based on the particular portion corresponding to a phoneme, diphone, triphone, syllable, word, and/or a combination thereof. In other embodiments, the speech synthesizer may be configured to generate a new audio signal that is fully or substantially artificial, and apply a voice pattern that has little or no similarity to the original speaking voice.

Figure 4:
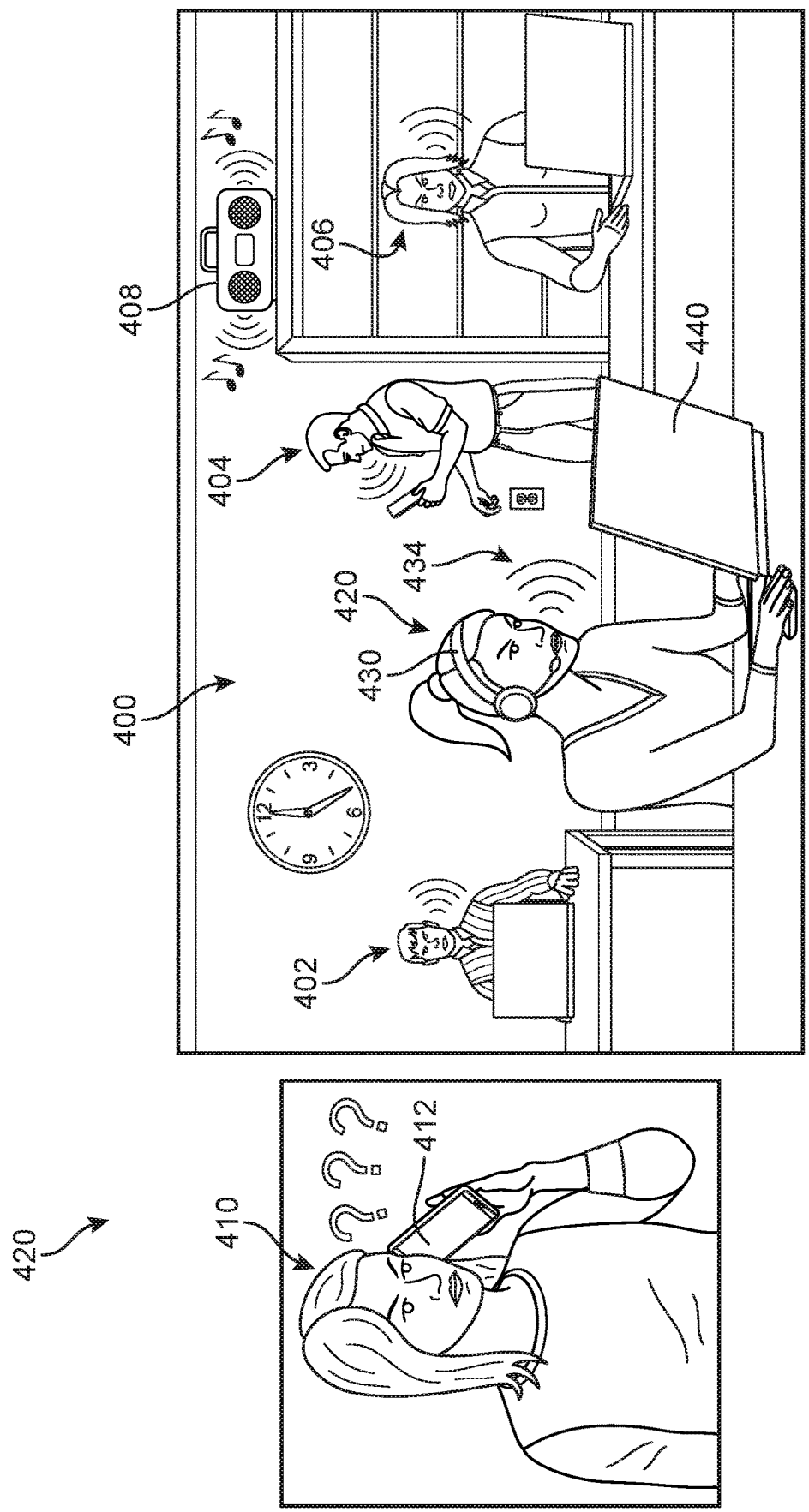
FIG. 4 is an illustration of a customer struggling to hear a support agent and a noisy workspace, according to an embodiment.

Referring now to FIGS. 4-8, a sequence of drawings illustrates one example of a use of a noise reduction system ("system"). In FIG. 4, a customer 410 is participating in a communication session 420 via a mobile device 412. The customer 410 is connected over a network to a support agent 420 who is located at an office location 400 that is remote from the customer 410. The office location 400 is a space in which four individuals are present, each engaged in their own dialogue and generating their own dynamic, random sound patterns. For example, a first person 402 at a first workstation is speaking across the gap between two workstations to a second person 406 seated at a second workstation as they collaborate on a work project. Thus, both first person 402 and second person 406 are emitting loud utterances, and in some cases, may be speaking louder to compensate for other sound sources in the vicinity. In FIG. 4, a third person 404 positioned between first person 402 and second person 406 assisting them both is also speaking into a transcription service via his mobile device as he works with first person 402 and second person 404, thereby producing additional noise. None of these three persons desired the distraction caused by additional speech unrelated to their conversations. As might be expected in an office environment, a radio 408 is also emitting music in the background, increasing the background noise. Thus, as support agent 420 attempts to communicate with the customer 410, she may struggle to speak loud enough to be heard over the ambient noise, represented by normal voice utterance 434 being spoken via a headset 430 and computing device 440. In addition, her coworkers and/or office policy may discourage loud calls, leading to a frustrating and stressful work environment.

Figure 5:
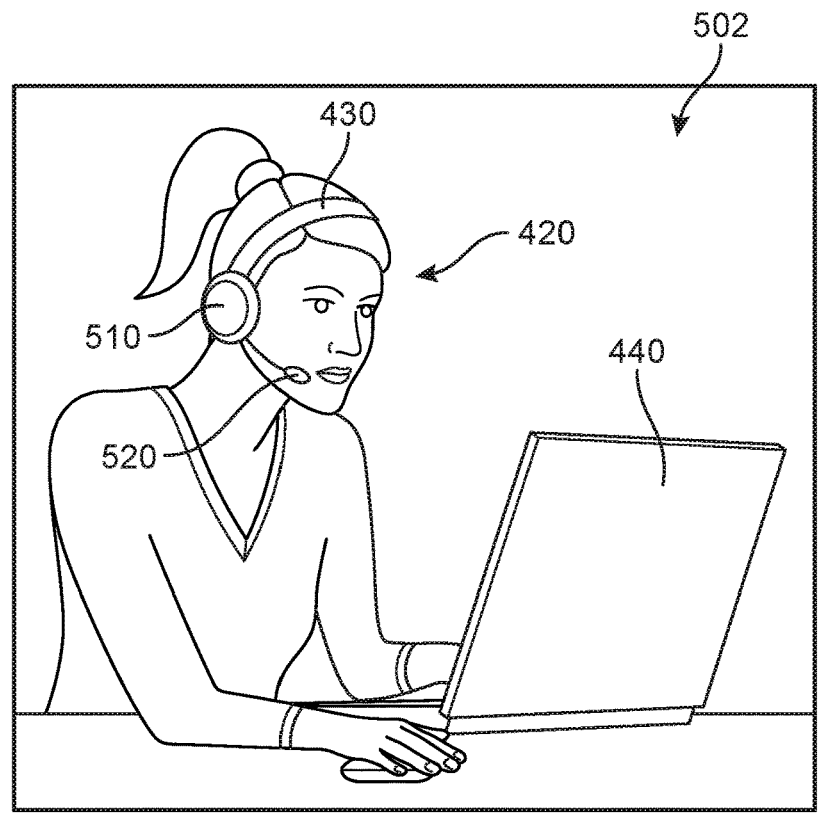
FIG. 5 is an illustration of a support agent connecting to a customer while wearing a headset with a proximity sensitive microphone, according to an embodiment.
Figure 5:
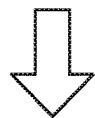
Figure 5:
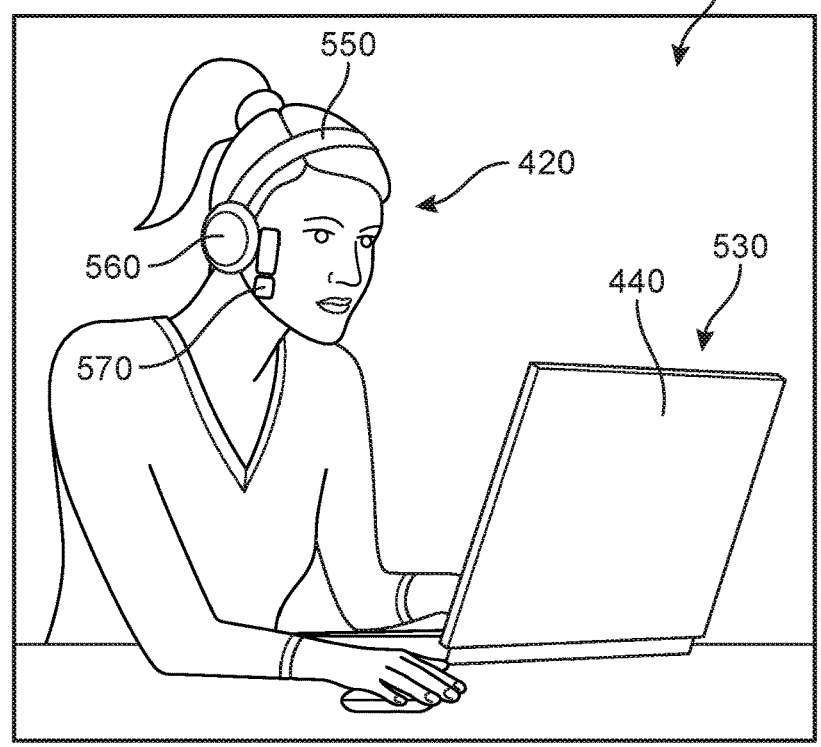

In FIG. 5, two isolated views of the support agent 420 are depicted to illustrate the transition between the conventional noisy arrangement, and the improved arrangement offered by the proposed systems and methods. At a first time 502, the support agent 420 is continuing to communicate via the traditional headset 430 with headphones 510 and an air-conduction based microphone 520. In contrast, at a second time 504, the support agent 420 has swapped to a new headset 550 that incorporates headphones 560 and a bone-conduction microphone 570 (or other PSM). The support agent 420 further accesses a speech recognition and synthesis platform (see FIG. 2) via a user interface presented on a display 530 of her computing device 440. In other embodiments, the system can be configured to perform similar functions as described with reference to FIGS. 1-8 herein but without the use of a PSM. For example, the platform may be configured with training data in a noisy office environment, and be able to isolate the support agent's quiet voice for further processing.

Figure 6:
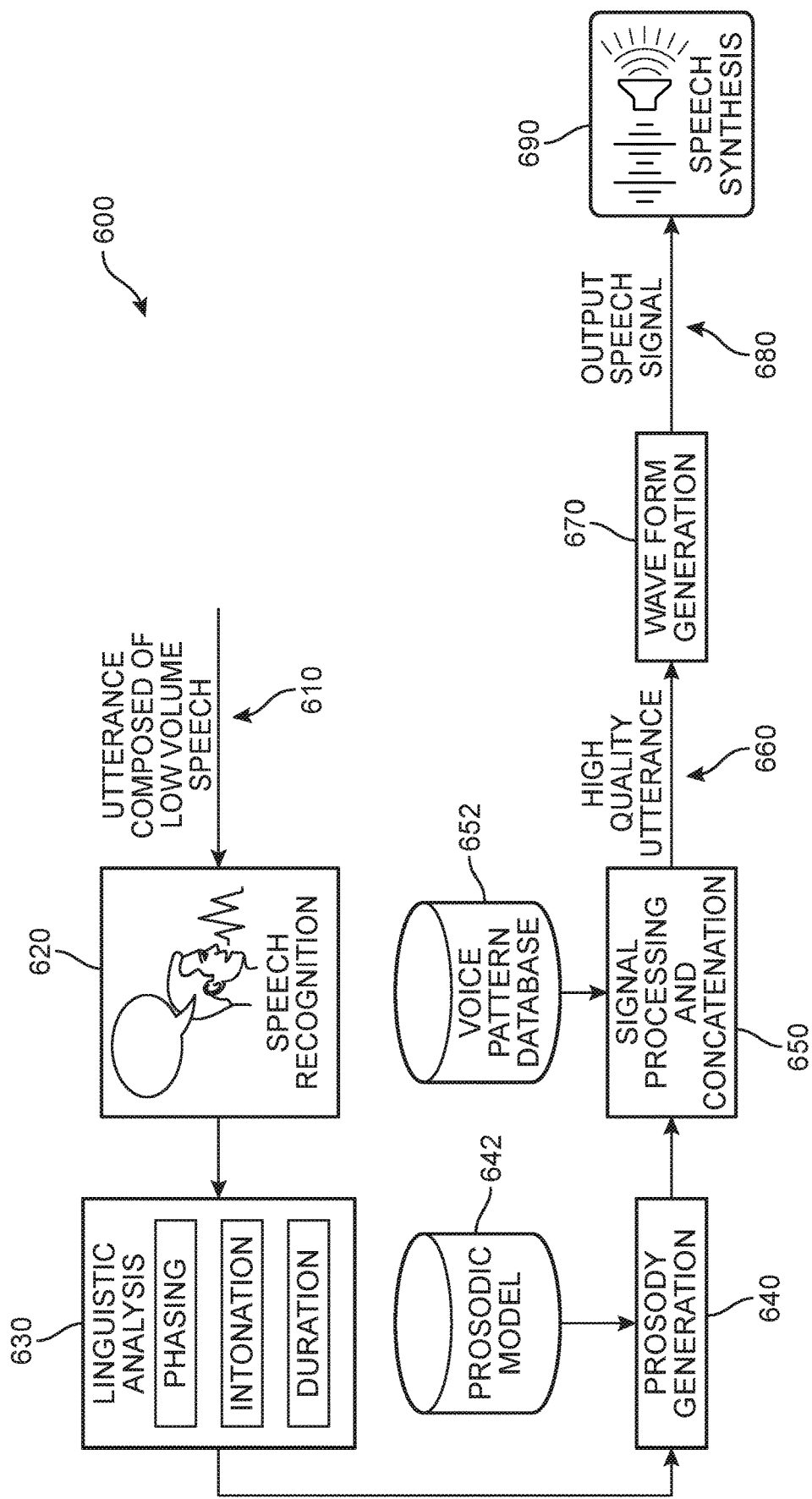
FIG. 6 is a flow diagram representing a process of generating high-quality speech via speech synthesis, according to an embodiment.

For purposes of clarity, in FIG. 6, a flow diagram of a noise reduction process is shown. Once the platform has been accessed, the support agent may speak one or more utterances 610 into the PSM with a reduced amplitude or volume. The utterances 610 are received by an automated speech recognition (ASR) application 620. In some embodiments, the ASR can be optimized by reference to previously stored training data for the current speaker. In some embodiments, additional linguistic analysis 630 may be performed to isolate and/or determine phasing, intonation, and durations of different portions of sound elements. In addition, a prosodic model 642 may be accessed by the system to correctly apply the results of the linguistic analysis and help generate a more natural-sounding speech result. Signal processing and concatenation 650 may also be performed on the signal with reference to the training data in which the voice patterns have been isolated (voice pattern database 652), increasing the similarity between the sound of the synthesized signal and the original voice. Finally, data 660 corresponding to a high-quality utterance is generated and submitted to a wave form generation unit 670 to be converted to an output audio speech signal 680. The speech signal can be transmitted to the speakers of the listener as clear, synthesized speech 690 in real-time, appearing to correspond to a timely response or portion of dialogue in the conversation. By isolating the specific words of an utterance and focusing the synthesis to those words, the process 600 also removes ambient noise and provides a listener with a sound that is free of background noise.

Figure 7:
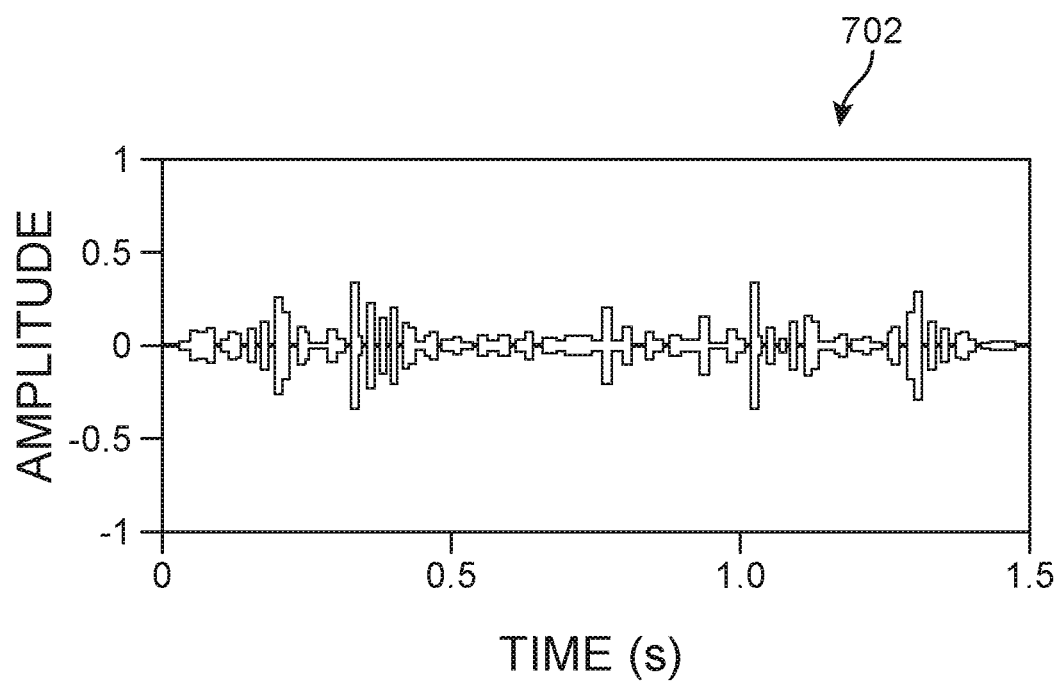
FIG. 7 is an illustration of a first speech signal corresponding to a whispered utterance by a support agent and a second speech signal corresponding to a playback of high-quality synthesized speech, according to an embodiment.
Figure 7:
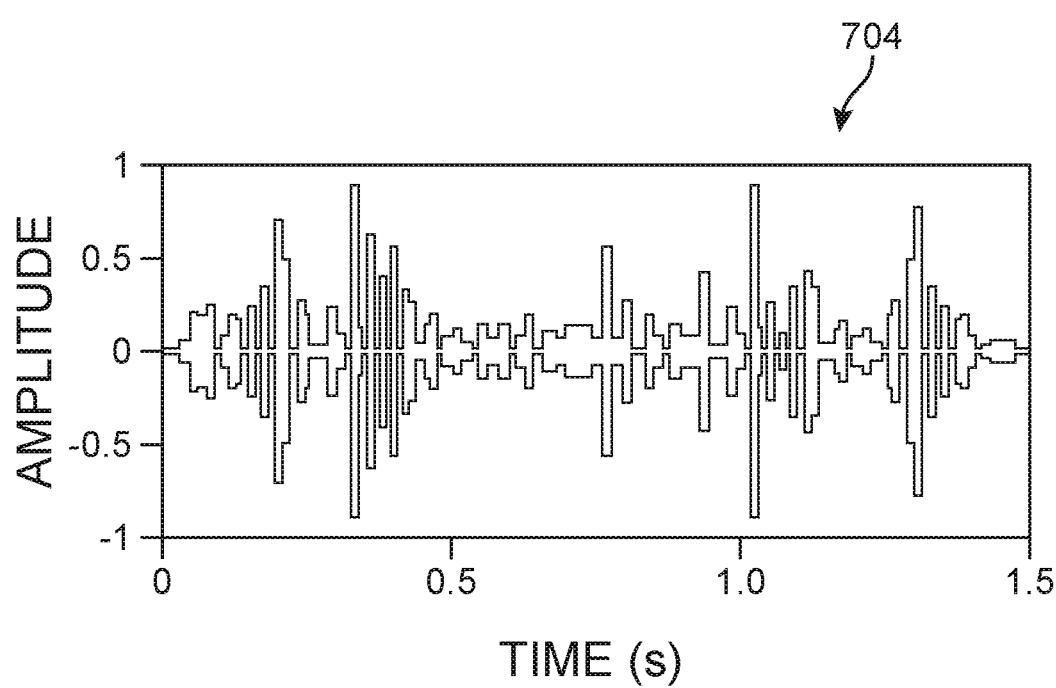

As a simplified illustration, FIG. 7 depicts two examples of a sound signal that both represent the same word content. In original speech utterance 702, the average amplitude across the signal is relatively low, and indicates a speech of low intelligibility. This signal, submitted to the speech conversion platform, is translated to determine the specific word content, and converted to a new, artificial signal 704 that is of a much greater amplitude, clear, and highly intelligible.

Figure 8:
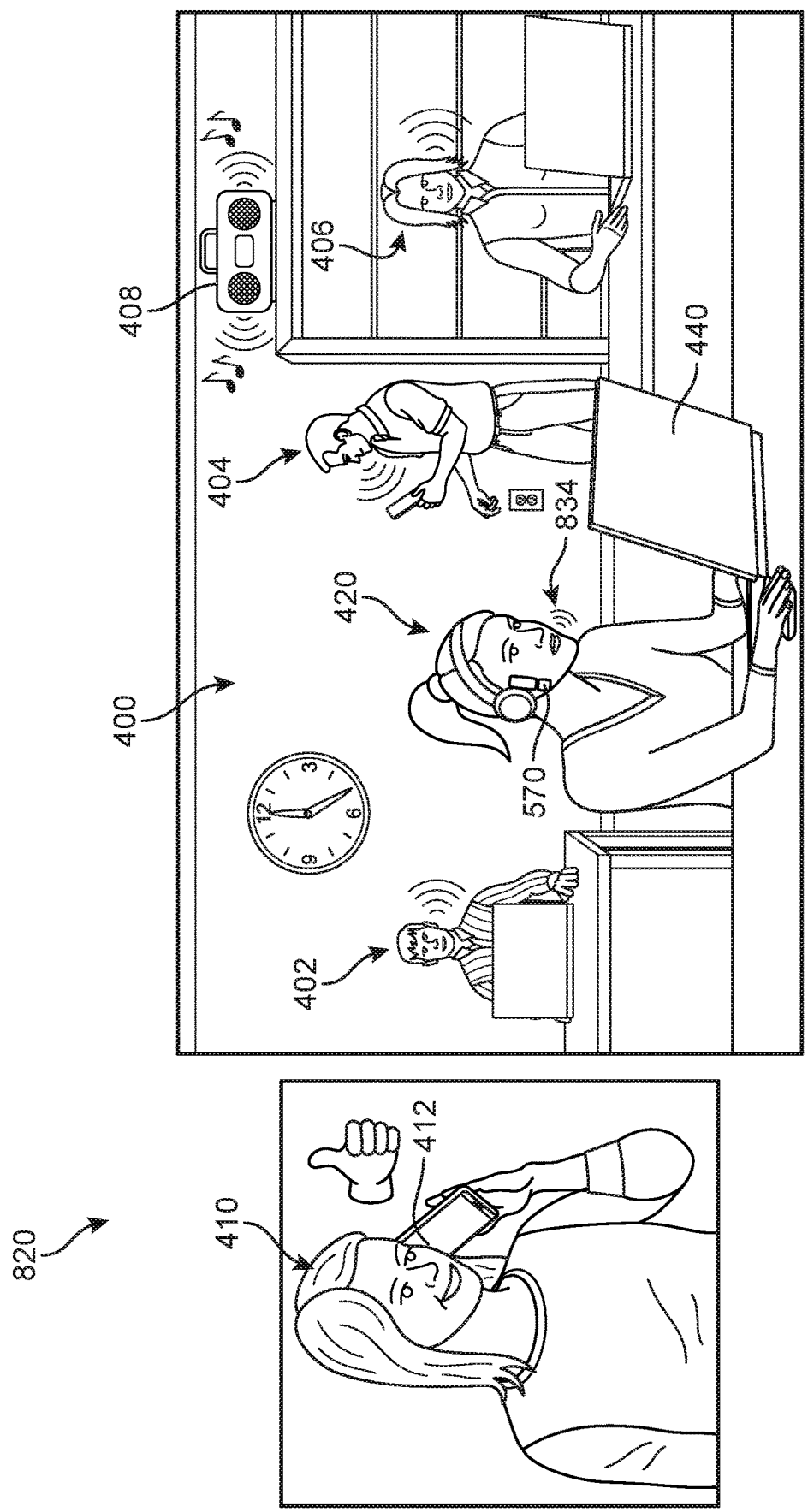
FIG. 8 is an illustration of a support agent speaking at low volume to a customer using a high-sensitivity microphone, according to an embodiment.

In FIG. 8, the customer 410 is now happily participating in a new or updated conversation session 820 in which the support agent 420 is speaking through bone-conduction microphone 570 and lowered her voice to a murmur 834. Her colleagues also present in the office 400 continue to engage in their 'noisy' activities, along with music emitted from radio 408, but as a result of the removal of ambient noise from the sound signals transmitted to the customer 410, a clear set of utterances are heard. Furthermore, first person 402, second person 406, and third person 404 are able to engage in their own project(s) with support agent 420 offering no distraction as she emits a barely discernable or fully imperceptible dialogue.

Figure 9:
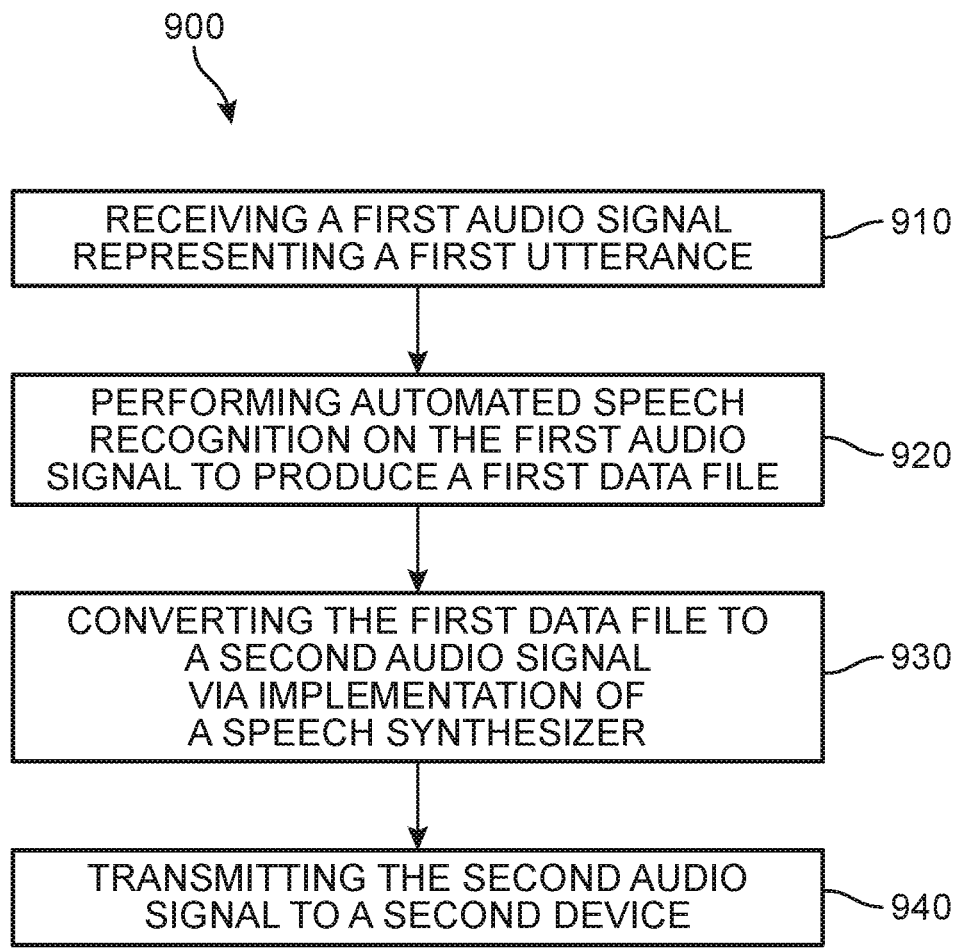
FIG. 9 is a flow diagram of a process for providing assistance to a customer using an augmented reality system, according to an embodiment.

FIG. 9 is a flow chart illustrating an embodiment of a method 900 for reducing noise in a shared work environment. The method 900 includes a first step 910 of receiving a first audio signal representing a first utterance of a human end-user. A second step 920 includes performing automated speech recognition on the first audio signal to produce a first data file identifying one or more words conveyed by the first utterance. In a third step 930, the method includes converting the first data file to a second audio signal via implementation of a speech synthesizer. In addition, the second audio signal is more audible than the first audio signal, and the second audio signal is synthesized speech representing a sequence of one or more words included in the first utterance. A fourth step 940 includes transmitting the second audio signal to a second device.

In other embodiments, the method may include additional steps or aspects. In one embodiment, the first audio signal is associated with a first average amplitude, the second audio signal is associated with a second average amplitude, and the second average amplitude is greater than the first average amplitude. In another example, the method also includes removing ambient noise present in the first audio signal from being presented in the second audio signal.

In some embodiments, the method may also include steps of receiving, prior to receiving the first audio signal, training data based on a recording of a recitation of one or more sentences by the human end-user, and then providing the training data to an automated speech recognition model to improve an accuracy of the first data file. In another embodiment, the method can include performing a playback of the second audio signal at the second device during a real-time communication session between the human end-user and a remote recipient.

In different embodiments, the first audio signal is received by a bone-conduction microphone, a high-sensitivity microphone, a noise canceling microphone, or a throat microphone, and/or a wearable device configured to detect sub-vocalized utterances. The method may also include providing the first audio signal to a prosodic analyzer to determine one or more of an intonation, inflection, pitch, tone, stress, and rhythm associated with the first utterance and generating resultant prosodic data about the first audio signal, sharing the resultant prosodic data with the speech synthesizer prior to the conversion of the first data file to the second audio signal, and then incorporating the resultant prosodic data such that the second audio signal better approximates a natural speech pattern.

In another example, the method may further include receiving multiple sets of training data from a plurality of human end-users, and identifying a profile of the human end-user to determine which set of training data will be used. In one embodiment, the speech synthesizer is accessed via a cloud-based service, while in other embodiments, the speech synthesizer is accessed and stored on a computing device associated with the human end-user.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for reducing noise in a shared work environment, the method comprising:
   receiving sets of training data from a plurality of human end-users;
   wherein each set of training data includes a first recording of a recitation of at least one sentence whispered at a low intelligibility and a second recording of a recitation of the at least one sentence spoken normally at a high intelligibility by a human end-user of the plurality of human end-users;
   receiving a first audio signal representing a first utterance whispered at a low intelligibility of a first human end-user;
   determining a selected set of training data to be used for speech synthesis, selected from the received sets of training data, by selecting a set of training data corresponding to the first human end-user based on speech recognition of the first audio signal as whispered speech;
   performing automated speech recognition on the first audio signal to produce a first data file identifying at least one word conveyed by the first utterance, based on a recognition model trained using the first recording included in the selected set of training data;
   analyzing prosody of the first audio signal representing the received first utterance whispered at a low intelligibility;
   converting the first data file to a second audio signal at a higher intelligibility via implementation of a speech synthesizer trained using the second recording included in the selected set of training data and the analyzed prosody, wherein the second audio signal is more audible than the first audio signal and the second audio signal is synthesized speech representing a sequence of the at least one word included in the first utterance;
   wherein the second audio signal is synthesized to have speech characteristics similar to those of the first utterance of the first human end-user based on using the selected set of training data to convert the first data file; and
   transmitting the second audio signal to a second device.

2. The method of claim 1, wherein the first audio signal is associated with a first average amplitude, the second audio signal is associated with a second average amplitude, and the second average amplitude is greater than the first average amplitude.

3. The method of claim 1, further comprising removing ambient noise present in the first audio signal from the second audio signal.

4. The method of claim 1, wherein an accuracy of the automated speech recognition is improved by using the selected set of training data to personalize the automated speech recognition.

5. The method of claim 1, further comprising performing a playback of the second audio signal at the second device during a real-time communication session between the human end-user and a remote recipient.

6. The method of claim 1, wherein the first audio signal is received by at least one of a bone-conduction microphone, a high-sensitivity microphone, a noise canceling microphone, and a throat microphone.

7. The method of claim 1, wherein the first audio signal is received by a wearable device configured to detect subvocalized utterances using electrical signals from at least one of facial muscles and vocal chords of the first human end-user.

8. The method of claim 1, further comprising:
providing the first audio signal to a prosodic analyzer to determine at least one of an intonation, inflection, pitch, tone, stress, and rhythm associated with the first utterance and generating resultant prosodic data about the first audio signal;
sharing the resultant prosodic data with the speech synthesizer prior to the conversion of the first data file to the second audio signal; and
incorporating the resultant prosodic data such that the second audio signal better approximates a natural speech pattern.

9. The method of claim 1, wherein the at least one word conveyed by the first utterance matches a portion of the selected set of training data and the speech synthesizer uses the portion of the selected set of training data to generate the second audio.

10. The method of claim 1, wherein the speech synthesizer is accessed via a cloud-based service.

11. A system for reducing noise in a shared work environment, the system comprising:
a processor;
non-transitory machine-readable media including instructions which, when executed by the processor, cause the processor to:
receive sets of training data from a plurality of human end-users;
wherein each set of training data includes a first recording of a recitation of at least one sentence whispered at a low intelligibility and a second recording of a recitation of the at least one sentence spoken normally at a high intelligibility by a human end-user of the plurality of human end-users;
receive a first audio signal representing a first utterance whispered at a low intelligibility of a first human end-user;
determine a selected set of training data to be used for speech synthesis, chosen from the received sets of training data, by selecting a set of training data corresponding to the first human end-user using speech recognition of the first audio signal as whispered speech;
perform automated speech recognition on the first audio signal to produce a first data file identifying at least one word conveyed by the first utterance, based on a recognition model trained using the first recording included in the selected set of training data;
analyze prosody of the first audio signal representing the received first utterance whispered at a low intelligibility;
convert the first data file to a second audio signal at a higher intelligibility via implementation of a speech synthesizer trained using the second recording included in the selected set of training data and the analyzed prosody, wherein the second audio signal is more audible than the first audio signal and the second audio signal is synthesized speech representing the at least one word of the first utterance;
wherein the speech synthesizer causes the second audio signal to have speech characteristics corresponding to those of the first utterance of the first human end-user based on using the selected set of training data to convert the first data file; and
transmit the second audio signal to a second device.

12. The system of claim 11, wherein the first audio signal is associated with a first average amplitude, the second audio signal is associated with a second average amplitude, and the second average amplitude is greater than the first average amplitude.

13. The system of claim 11, wherein the instructions further cause the processor to remove ambient noise present in the first audio signal from the second audio signal.

14. The system of claim 11, wherein an accuracy of the automated speech recognition is improved by using the selected set of training data to personalize the automated speech.

15. The system of claim 11, wherein the instructions further cause the processor to perform a playback of the second audio signal at the second device during a real-time communication session between the human end-user and a remote recipient.

16. The system of claim 11, wherein the first audio signal is received by at least one of a bone-conduction microphone, a high-sensitivity microphone, a noise canceling microphone, and a throat microphone.

17. The system of claim 11, wherein the first audio signal is received by a wearable device configured to detect subvocalized utterances based on measuring electrical signals from at least one of facial muscles and vocal chords of the first human end-user.

18. The system of claim 11, wherein the instructions further cause the processor to:
provide the first audio signal to a prosodic analyzer to determine at least one of an intonation, inflection, pitch, tone, stress, and rhythm associated with the first utterance and generating resultant prosodic data about the first audio signal;
share the resultant prosodic data with the speech synthesizer prior to the conversion of the first data file to the second audio signal; and
incorporate the resultant prosodic data such that the second audio signal better approximates a natural speech pattern.

19. The system of claim 11, wherein the at least one word conveyed by the matches a portion of the selected set of training data and the speech synthesizer uses the portion of the selected set of training data to generate the second audio signal.

20. A system for reducing noise in shared work environments, the system comprising:
a processor;
non-transitory machine-readable media including instructions which, when executed by the processor, cause the processor to:

receive sets of training data from a plurality of human end-users;

wherein each set of training data includes a first recording of a recitation of at least one sentence subvocalized at a low intelligibility and a second recording of a recitation of the at least one sentence spoken normally at a high intelligibility by a human end-user of the plurality of human end-users;

receive a first audio signal representing a first utterance subvocalized at a low intelligibility of a first human end-user by a wearable device configured to detect subvocalized utterances using electrical signals from at least one of facial muscles and vocal chords of the first human end-user;

determine a selected set of training data to be used for speech synthesis, selected from the received sets of training data, based on selecting a set of training data corresponding to the first human end-user based on speech recognition of the first audio signal as subvocalized speech;

perform automated speech recognition on the first audio signal to produce a first data file identifying at least one word conveyed by the first utterance, based on a recognition model trained using the first recording included in the selected set of training data;

analyze prosody of the first audio signal representing the received first utterance subvocalized at a low intelligibility;

convert the first data file to a second audio signal at a higher intelligibility via implementation of a speech synthesizer trained using the second recording included in the selected set of training data and the analyzed prosody, wherein the second audio signal is more audible than the first audio signal and the second audio signal is synthesized speech representing a sequence of at least one word included in the first utterance;

wherein the second audio signal is synthesized to have speech characteristics similar to those of the first utterance by the first human end-user based on using the selected set of training data while using the speech synthesizer to convert the first data file; and transmit the second audio signal to a second device.

* * * * *